Oct. 11, 1949.　　　　E. W. KELLOGG ET AL　　　　2,484,348
CLAW PULL-DOWN MECHANISM

Filed April 16, 1947　　　　　　　　　　　　　　3 Sheets-Sheet 1

Inventors
EDWARD W. KELLOGG
& WARREN R. ISOM
Attorney

Oct. 11, 1949.  E. W. KELLOGG ET AL  2,484,348
CLAW PULL-DOWN MECHANISM
Filed April 16, 1947  3 Sheets-Sheet 2
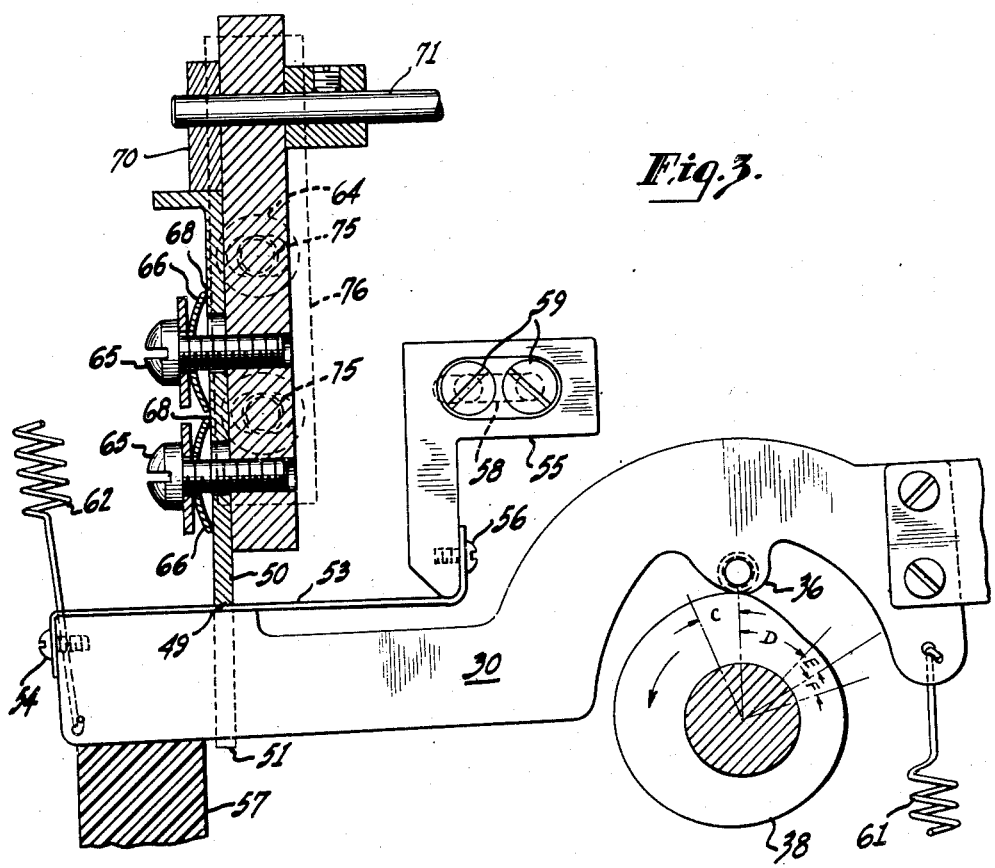
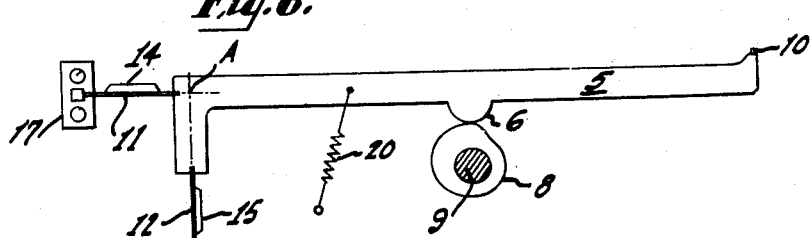
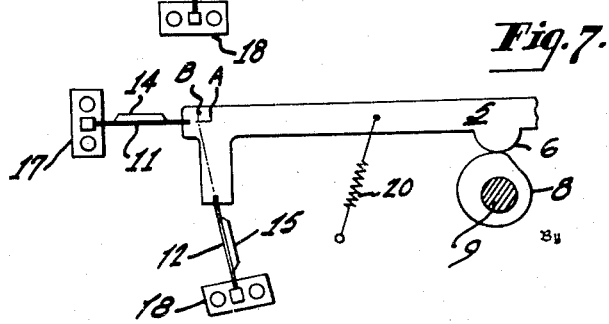
Inventors
EDWARD W. KELLOGG
& WARREN R. ISOM Oct. 11, 1949.　　　E. W. KELLOGG ET AL　　　2,484,348
CLAW PULL-DOWN MECHANISM
Filed April 16, 1947　　　　　　　　　　　3 Sheets-Sheet 3
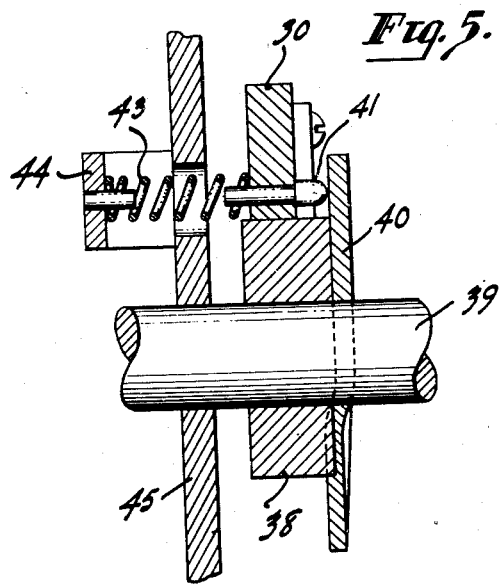
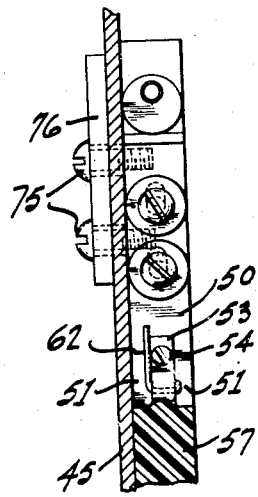
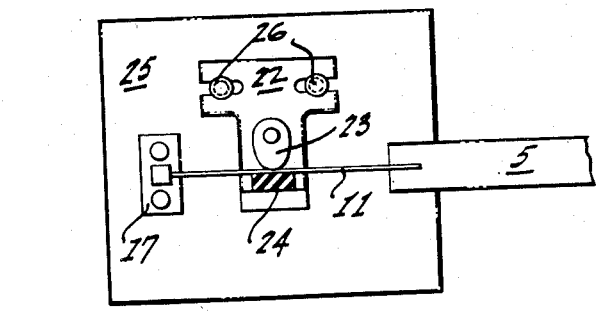
Inventors
EDWARD W. KELLOGG.
& WARREN R. ISOM
By　C D Tuska
　　　Attorney Patented Oct. 11, 1949

2,484,348

UNITED STATES PATENT OFFICE 2,484,348

CLAW PULL-DOWN MECHANISM

Edward W. Kellogg, Haddonfield, and Warren R. Isom, West Collingswood, N. J., assignors to Radio Corporation of America, a corporation of Delaware Application April 16, 1947, Serial No. 741,834

14 Claims. (Cl. 88—18.4)

This invention relates to motion picture film advancing mechanisms and particularly to a claw intermittent drive of the cam and follower type.

In a widely used form, the mechanism comprises a claw having one or more teeth to engage perforations in the film, carried on an arm which is pivoted at the end opposite to the claw, and actuated by a cam which is located at an intermediate point. This arrangement makes it possible to adjust the total movement or throw of the claw, by altering the ratio of the distances from pivot to claw, and from pivot to cam. Such an adjustment is very advantageous from a manufacturing standpoint in that cams may vary slightly in production, but it is important that the throw of the claw be held within very close limits, the desired throw being greater than the film perforation pitch by a very small margin. The claw-teeth must be positioned in line with the perforations, and with the ordinary type of pivot this requirement precludes adjusting throw by shifting the pivot. An alternative is to shift the cam. This can be done, but at the cost of considerable complication of mechanism. Another alternative is to make the arm in two or more parts which can be fastened together in altered relation, thereby for example altering the arm-length to compensate for moving the pivot. The present invention employs a novel form of pivot which permits moving the pivot point without disturbing the alignment of the claw-teeth with respect to the film perforations.

In the present invention the above results are afforded by a simple cam and follower mechanism easy to adjust and maintain in working condition while being economical to manufacture. The pivot of the pull-down mechanism of the invention requires no lubrication and has no lost motion, and can be shifted to increase or decrease the throw without altering the lateral position of the claw with respect to the film in the picture gate. Neither is it necessary to attach any adjusting device to the claw arm as in some known mechanisms.

A feature which is common to intermittent pull-down mechanisms is that the pull-down pins or teeth enter the perforations above the bottom edges of the perforations. No movement of the film occurs until the claw has begun its downward movement and closed up the gaps bringing the contact surfaces of the pins against the edges of the film. Providing a throw adjustment makes it possible to set this initial clearance at the smallest practicable value. Furthermore in the present invention the cam is so shaped that this preliminary movement is at low velocity thereby preventing a sharp blow being struck against the film when the rapid portion of the stroke begins. Also, the pull-down motion is such that immediately after the rapid portion of the stroke, the pull-down pins are slightly displaced downwardly and then immediately back to their lower rest position at which the withdrawal of the pins begins. This motion pushes the film slightly beyond the point at which its rapid speed was stopped, thus taking up any variations which the powerful inertia effects may have introduced, while the slight rise of the pins causes them to clear the film before the withdrawal and thus avoid disturbing the film or wearing the film edges. These characteristics of the claw motion make it practicable to accomplish the pull-down in a minimum of time without random variations in the picture position on the one hand nor excessive noise and wear on the film, on the other hand. A divisional application, Ser. No. 101,042, was filed June 24, 1949, on the new method of positioning the film in the projection aperture.

A principal object of our invention, therefore, is to provide an improved cam and follower film pull-down mechanism which is simple and economical to manufacture and which provides independent adjustments of the claw element.

Another object of the invention is to provide improved accuracy in the intermittent positioning of motion picture film in a camera or projection aperture.

Another object of the invention is to provide an improved means for intermittently advancing film to provide a short pull-down time period and a long stationary time period.

A still further object of the invention is to provide a cam and follower film pull-down mechanism having an improved motion during the pull-down portion of the cycle.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 3 is a partial enlarged view in elevation of the invention taken along line 3—3 of Fig. 1;

Fig. 4 is a detailed view of the throw adjustment taken along the line 4—4 of Fig. 2;

Fig. 5 is a partial view in cross section of the in-and-out and pull-down cams taken along the line 5—5 of Fig. 2; and Figs. 6, 7 and 8 are diagrammatic views showing the principles of operation of one form of the invention.

Figure 1:
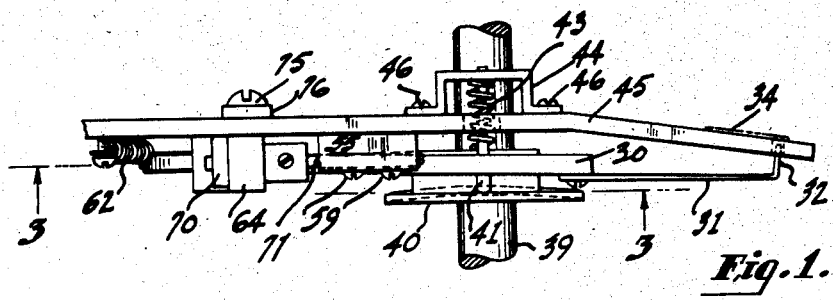
Fig. 1 is a plan view of a pull-down mechanism embodying the invention.

Referring now to Figs. 6, 7 and 8, a cam arm 5, having a follower 6, is raised and lowered by a cam 8 driven by a shaft 9. The cam arm 5 has a claw 10 at one end and is mounted on a pair of flat springs 11 and 12 at the other end, the springs being suitably stiffened by bending up the edges thereof as shown at 14 and 15, respectively. The spring 11 has one end fixedly attached on a mounting block 17 while the spring 12 has one end mounted in an adjustable mounting block 18. A spring 20 maintains the follower 6 in contact with the cam 8 at all times.

The two mounting springs 11 and 12 of Fig. 6 produce the effect of a pivot at A. Spring 14 will not permit any horizontal movement of the point A and spring 15 will not permit any vertical movement thereof, but by flexing, the springs will permit rotational motion about the point A. The effective pivot is at the point of intersection of the axes of the two springs 14 and 15. If the two mounting blocks 17 and 18 are maintained in fixed relative positions, the device of Fig. 6 would be equivalent to the conventional pivoted claw arm. The pivot point would remain at A and thus at a fixed distance from the claw 10. The pivot could be moved by moving both blocks together, just as a conventional pivot could be moved, up or down to bring the picture into "frame," or to left or right to position the teeth with respect to the row of film perforations, but such movement would alter the throw, or conversely if they are positioned to give the correct throw, the claw position would probably be wrong. Hence with conventional pivots it is usual to position the arm by correctly locating the pivot in the horizontal direction, while it may be moved vertically to frame the picture. Then to adjust throw it is necessary to move the point of contact between cam 8 and follower surface 6 to right or left. If on the other hand the relative positions of blocks 17 and 18 are altered as shown in Fig. 7, the effective pivot point can be moved, for example to the point B, thereby altering the throw, without upsetting the claw position, and it is not necessary to do anything to the cam and follower. The effect is equivalent to moving a conventional pivot to a new position on the frame of the machine, and simultaneously moving it to a new position on the claw arm, such that the throw has been altered but the lateral position of the arm has remained unchanged.

Assuming that it is desired to decrease the throw of the claw or that the pivot point should be moved farther to the left, it is only necessary to rotate the block 18 and shift it to right as shown in Fig. 7. The pivot point now has been moved from point A to point B, the new intersection of the axes of the springs 11 and 12. This has been accomplished without, in any material manner, shifting the claw laterally inasmuch as the block 17 remains in a fixed position. Similar results could also be obtained by using, instead of the springs, rigid links the ends of which would be pivoted on the blocks 17 and 18 and at the points on the arm 5 at which the springs are shown attached. The statement that the springs prevent all points in line with their axes from executing any movements parallel to their average axes directions, is approximate only. Actually, slight parallel movements would occur, but these are of second order magnitude, and in view of the small angles of rotation involved, are small enough to make the error negligible.

Another form of spring pivot in which the adjustment for throw can be made without disturbing the position of the claw with respect to the sprocket holes of the film is shown in Fig. 8. In this modification only the horizontal spring 11 is used and this spring is not stiffened at the middle but is uniform and of somewhat heavier material than would be employed in the construction shown in Figs. 6 and 7. Spring 11 is again anchored in the block 17 and the other end is attached to the arm 5 as in Figs. 6 and 7, thereby fixing the lateral location of the claw with respect to the sprocket holes. In this modification a clamping device consisting of a horizontally adjustable plate 22 is provided on which there is a rounded projection 23 contacting the upper surface of the spring 11 and a resilient block 24 of rubber or similar material directly under the projection 23. The block 22 is held to the supporting frame 25 by a pair of screws or bolts 26 in elongated slots in the block 22. The rubber block 24 serves to resist any tendency of the spring to leave its pivot point on the projection 23 and also to damp any vibrations of the spring 11 which might tend to produce noise. The point of contact between the projection 23 and spring 11 now determines the pivot point for the arm 5 and this point may be shifted horizontally by moving the block 22 in the slots without shifting the claw or the arm laterally.

A preferred embodiment of the invention is illustrated in Figs. 1 to 5. The same principle is applied, as shown in Fig. 8, a horizontal flat spring serving to position the arm, while the pivot consists of a rocker point which can be shifted horizontally to adjust throw. However, the embodiment in Figs. 1 to 5 differs from that in Fig. 8 in that the rocker point bears against the rigid portion of the arm, instead of against the horizontal spring at a point intermediate said rigid portion and the mounting block 17 as in Fig. 8.

Figure 2:
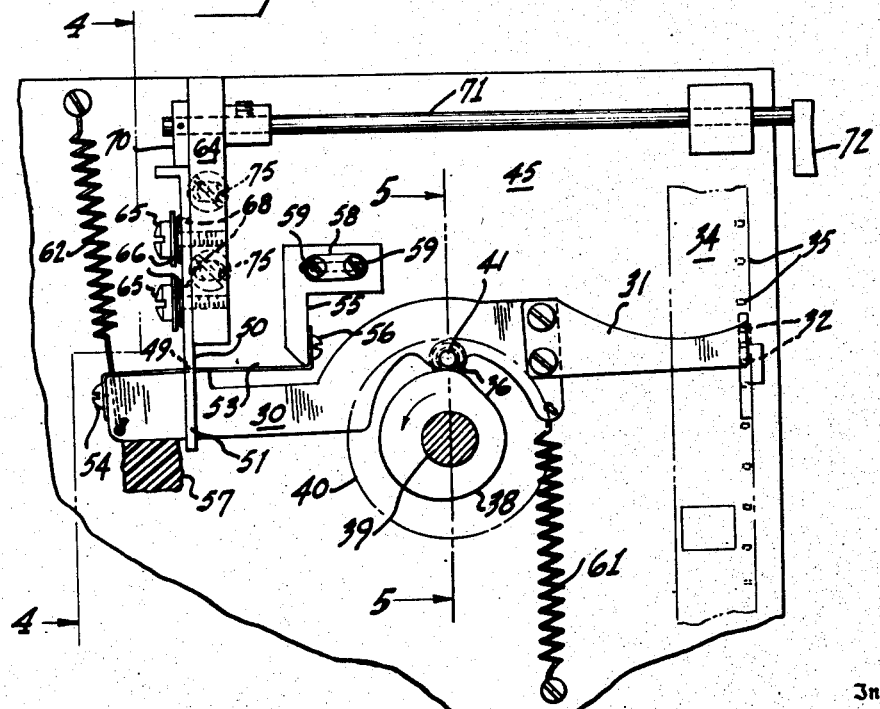
Fig. 2 is an elevational view of the invention as shown in Fig. 1.

Referring now to the drawings of Figs. 1 to 5 in which the same numerals identify like elements, a pull-down arm 30 corresponds to the arm 5 in Figs. 6, 7 and 8, the arm 30 having a claw element 31 attached thereto, the latter having pull-down pins or teeth 32. A film 34, with a single row of sprocket holes, 35, is shown in Figs. 1 and 2 in relation to the other elements of the mechanism. The arm 30 has its follower portion 36 in contact with a cam 38 driven by shaft 39, shaft 39 having an in-and-out cam 40 also mounted thereon to cause the teeth to enter the perforations 35 and be withdrawn therefrom. The cam 40 has its follower 41 attached to the arm 30, the follower 41 being held in contact with the surface of the cam 40 by a compression spring 43 having one end fixedly positioned by a bracket 44 attached to the frame 45 in any suitable manner such as by screws 46. (See Figs. 1 and 5.) Thus, as the shaft 39 is rotated, the cam 40 is rotated and the teeth 32 pass into and out of the sprocket holes 35 according to its up and down position determined by the cam 38.

The pivot end of the arm 30 is mounted between the two prongs 51 of a fork 50 and held against a rounded pivot edge 49 of the yoke of the fork by a spring 62. Mounted along the upper edge of the widened end of the arm 30 is a flat spring 53 having one end bent over the end of the arm 30 and attached thereto by a screw 54 and its other end extending, and attached to, a lateral placement adjusting block 55 by a screw 56. The block 55 has a horizontal slot 58 therein and is, therefore, adjustable laterally and then firmly held in position by a pair of screws 59. Thus, any adjustment of the block 55 will control the lateral or horizontal position of the teeth 32 on claw 31 with respect to the sprocket holes 35 of the film 34 and once this adjustment has been made it will maintain the lateral placement of the claw even though other adjustments are made to alter the amount of the up and down travel of the claw or the framing position of the claw. It will be noted that the spring 53 corresponds to the spring 11 in Figs. 6, 7 and 8, but extends in the opposite direction, namely, from its point of attachment to the arm to an anchor block on the right instead of on the left. This does not involve any difference in principle, but enables the spring to perform its function with less flexure. A spring 61 corresponding to spring 20 maintains follower 37 in contact with cam 38. The placing of spring 53 between the rocker edge 49 and body of arm 30 has no functional significance, but makes for convenience in attaching it to the body. It will be noted that the fork 50, 51 is deep and the body 30 is wide at this point. This keeps the claw arm in a vertical plane, while leaving it free to rock up and down or sidewise to move the teeth in and out.

The fork 50 is mounted on a vertical bar 64 by screws 65 bearing against pressure springs 66. The fork 50 has elongated holes 68 therein which permit the fork to slide vertically on the bar 64 when pressure is applied against its upper end by a cam 70 mounted on a rod 71. The fork is held against the cam 70 by spring 62. The rod 71 extends to a handle 72 which adjusts the cam 70. This arrangement permits framing of the picture in the aperture inasmuch as it will shift the pivot edge of the fork 50 in a vertical direction only, thus changing the position that each picture frame is stopped at the end of the pull-down portion of the cycle, without shifting the arm 30 laterally, and without changing the amount of throw of the claw.

As mentioned above it is also desirable to shift the throw of the teeth 32 without disturbing the lateral placement of the teeth of the claw with respect to the sprocket holes of the film. This is accomplished by laterally shifting the pivot edge of the fork without laterally shifting the arm itself according to the principle explained in connection with Fig. 8. To make it possible to shift the fork 50 laterally, the bar 64 is mounted to the frame 45 on screws 75 which pass through horizontally elongated holes in the frame. The screws 75 pass through a backing member 76 to increase the holding ability to the adjustment when the fork 50 is once positioned. By shifting the pivot edge of the fork 50 along the spring 53 a longer or shorter throw is obtained for the claw without shifting it laterally, its lateral position being determined by the position of the block 55. A damper of any suitable material, such as a rubber block 57, is provided near the ends of the prongs 51 and bearing against a bracket (not shown) mounted on the frame 45. The rubber block 57 is not an essential element, since spring 20 holds the arm against the rocker, but it may be employed either as a substitute for said spring or supplementary thereto. It has the merit of reducing certain vibrations and thus making the machine operate more quietly.

While we prefer to employ a horizontal flat spring such as 53 to position the claw arm, there are other expedients for accomplishing the same purpose, which we regard as equivalent. For example, a block corresponding to 55 and adapted to being shifted in position, may carry a pin, engaging a vertical slot in arm 30, or vice versa, the pin may be on the arm and the slot in the block.

It is evident that the useful features of the pivot system of our invention do not depend on making the block adjustable in position. If, for example, the manufacturer can make the parts to such accuracy that the teeth will line up with the film perforations without resort to an adjustment, the spring may be attached directly to the frame. The essential value of the pivot of our invention is in that the throw may be adjusted without disturbing the position of the arm.

To obtain the type of downward motion during the pull-down portion of the cycle as described above, the cam 38 is provided with a configuration such that, during its travel through the angle C, a slight preliminary movement is obtained before the rapid pull-down motion which exists during rotation of the cam 38 through the angle D. (See Fig. 3.) At the end of angle D a slower downward movement occurs through the angle E, after which a slight upward movement is given to the teeth 32 through the angle F at which point the claw is removed from the film by the cam 40. The preliminary downward motion brings the teeth 32 in contact with the film before the rapid motion begins, thus preventing a blow being imparted to the edges of the film perforations, which would occur if the claw should attain any considerable velocity before the teeth touch the edges of the perforations.

Since the friction of the film under the gate shoes is variable, and the end of the downward stroke is characterized by very rapid deceleration, there is the possibility of whipping of the end of the claw, leaving the actual stopping place of the film somewhat uncertain. A slight additional movement of the claw of the order of .001 to .002 inch, taking place more slowly and accompanied by smaller values of retardation, tends to make the final film position correspond more precisely with the geometry of the mechanism undisturbed by inertia effects. This small after movement, even though it be permitted to occur after the shutter has begun to open, does not give rise to objectionable travel ghost since its magnitude is extremely small, and the interval of illuminated screen while this small movement is taking place, is a small fraction of the cycle. After the teeth have reached their extreme downward position, they are then slightly raised, so that they can be withdrawn without disturbing the film after it has been once positioned.

The following table shows an example of a cam design in accordance with the principles set forth above. It is contemplated that the shutter will darken the screen for 45° of cam rotation, namely, from the time indicated by 0 to that indicated by 45. However, this does not correspond exactly with the angle D in Fig. 3, which is from 0 to 44, during half of which there is high downward acceleration, and high retardation during the second half. The cam design is specified in terms of the position the claw is to occupy, corresponding to each position of the driving cam. The method of laying out a cam when the desired follower position for each cam position is given, is well known, and is illustrated, for example, in Figure 1 of the paper entitled "Calculation of accelerations in cam-operated pull-down mechanisms," by E. W. Kellogg, Journal of the Society of Motion Picture Engineers, August, 1945. In the case of the present design, the pitch of the film perforations is taken as 300 mils for fresh film, but may be of any value between 300 and about 297 mils (0.297 inch) for films of various degrees of shrinkage. The total throw is seen to be 303.02 mils, so the teeth will enter the perforation of an unshrunk film with a clearance of about 3 mils. They then descend for about 4 mils with a velocity not exceeding 1 mil per degree of cam rotation. Thus with films having perforation pitches of 299 to 300 mil pitch, the tooth velocity at the instant of contact will not exceed 1 mil per degree. With films of greater shrinkage, the teeth will reach slightly higher velocities before making contact. If the film happens to have a pitch of 297 mils (corresponding to one percent shrinkage), the velocity with which the teeth hit the edges of the perforations will be 1.75 mils per degree. For comparison, we may consider a cam of the usual type in which the acceleration starts at full value and the total travel of 303 mils is to be achieved in 46° of cam rotation. This would call for an acceleration of 5.93 mils per degree squared, and the velocity after a travel of 3 mils, or at the point at which it would start an unshrunk film, would be 1.855 mils per degree, and at the end of a travel of 6 mils, where it would strike a 1 percent shrunk film, the velocity would be 2.62 mils per degree. Since the force of an impact varies as the square of the velocity, the hammering of the teeth on the film at the start of pull-down is very materially reduced by the employment of the principle of our invention just described.

In the table, in order to conveniently calculate velocities and accelerations, time has been expressed in units corresponding to one degree of rotation of the driving cam. The velocities and accelerations so expressed can be readily converted to standard units such as centimeters and seconds by application of well-known dimensional formulas.

*Properties of cam*

| Time $t$ Degrees Cam Rot. | Accel. $a$ mils/degs.$^2$ | Veloc. $v$ mils/deg. | Travel $s$ mils | Angle |
|---|---|---|---|---|
| −5 |  | 0 | 0 |  |
| −4 | .5 | .5 | .25 | C |
| −3 | .5 | 1.0 | 1.0 | C |
| −2 | 0 | 1.0 | 2.0 | C |
| −1 | 0 | 1.0 | 3.0 | C |
| 0 | 0 | 1.0 | 4.0 | C |
| 1 | .524 | 1.52 | 5.26 | D |
| 2 | .524 | 2.05 | 7.05 | D |
| 3 | .524 | 2.57 | 9.36 | D |
| 4 | .524 | 3.10 | 12.19 | D |
| 5 | .524 | 3.62 | 15.55 | D |
| 6 | .524 | 4.14 | 19.43 | D |
| 7 | .524 | 4.67 | 23.84 | D |
| 8 | .524 | 5.19 | 28.77 | D |
| 9 | .524 | 5.72 | 34.22 | D |
| 10 | .524 | 6.24 | 40.20 | D |
| 11 | .524 | 6.76 | 46.70 | D |
| 12 | .524 | 7.29 | 53.73 | D |
| 13 | .524 | 7.81 | 61.28 | D |
| 14 | .524 | 8.34 | 69.35 | D |
| 15 | .524 | 8.86 | 77.95 | D |
| 16 | .524 | 9.38 | 87.07 | D |
| 17 | .524 | 9.91 | 96.72 | D |
| 18 | .524 | 10.43 | 106.89 | D |
| 19 | .524 | 10.96 | 117.58 | D |
| 20 | .524 | 11.48 | 128.80 | D |
| 21 | .524 | 12.00 | 140.54 | D |
| 22 | .524 | 12.53 | 152.81 | D |
| 23 | −.524 | 12.00 | 165.07 | D |
| 24 | −.524 | 11.48 | 176.82 | D |
| 25 | −.524 | 10.96 | 188.03 | D |
| 26 | −.524 | 10.43 | 198.73 | D |
| 27 | −.524 | 9.91 | 208.90 | D |
| 28 | −.524 | 9.38 | 218.54 | D |
| 29 | −.524 | 8.86 | 227.67 | D |
| 30 | −.524 | 8.34 | 236.26 | D |
| 31 | −.524 | 7.81 | 244.34 | D |
| 32 | −.524 | 7.29 | 251.89 | D |
| 33 | −.524 | 6.76 | 258.91 | D |
| 34 | −.524 | 6.24 | 265.42 | D |
| 35 | −.524 | 5.72 | 271.39 | D |
| 36 | −.524 | 5.19 | 276.85 | D |
| 37 | −.524 | 4.67 | 281.78 | D |
| 38 | −.524 | 4.14 | 286.18 | D |
| 39 | −.524 | 3.62 | 290.07 | D |
| 40 | −.524 | 3.10 | 293.42 | D |
| 41 | −.524 | 2.57 | 296.26 | D |
| 42 | −.524 | 2.05 | 298.57 | D |
| 43 | −.524 | 1.52 | 300.35 | D |
| 44 | −.524 | 1.0 | 301.62 | E |
| 45 | −.5 | .5 | 302.37 | E |
| 46 | −.3 | .2 | 302.72 | E |
| 47 | 0 | .2 | 302.92 | E |
| 48 | −.2 | 0 | 303.02 | F |
| 49 | −.5 | −.5 | 302.77 | F |
| 50 | −.5 | −1.0 | 302.02 | F |
| 51 | −.5 | −1.5 | 300.77 | F |
| 52 | +.5 | −1.0 | 299.52 | F |
| 53 | +.5 | −.5 | 298.77 | F |
| 54 | +.5 | 0 | 298.52 | F |
| 55 | 0 |  | 298.52 |  |

It will be seen that at the end of the downward movement at $t=44$, at which the velocity has been reduced to 1 mil per degree, the rate of retardation is quickly dropped, but the downward movement continues relatively slowly during four degrees of additional cam rotation (angle E). This gives inertia effects of the mechanism and film time to spend themselves before the final positioning of the film. The teeth are then raised, at a rate which is not critical, until they clear the perforation edges by a safe margin (this occurs while the cam rotates through angle F), and then the teeth are withdrawn under the control of cam 40. Aside from more consistent positioning of the film, an additional advantage of ending the claw movement under conditions of low deceleration rate, is that lighter picture gate friction suffices to hold the film from overshooting the position to which the teeth push it.

It is not new in the motion picture art, to employ pull-down mechanisms in which the initial and final accelerations are less than the maximum values. For example, this is true of the familiar "Geneva movement," but this is an accidental characteristic, inherent in the mechanism, and takes the form of extremely high accelerations near the middle of the stroke, rather than very low accelerations at the beginning and end. In the cam of our invention the accelerations are applied in purposeful manner, to (1) take up the slack at the beginning of the stroke without shock in spite of ordinary variations in the amount of slack, and as soon as this is done, (2) accomplish the main pull-down movement in a given time with the lowest compatible maximum values of acceleration and retardation (which is by immediately applying the chosen maximum value of acceleration and maintaining this to the middle of the stroke, and then applying an equal constant retardation for the balance of the principal movement), and (3) to push the film to its final position under conditions of very small rates of retardation, which must be low for a long enough period for the elements of the mechanism to recover from any vibratory disturbances resulting from the previous high retardation forces.

Thus, the above mentioned pull-down mechanism has the advantage of having an independent placement adjustment such as adjustable block 55, an independent throw adjustment, such as adjustable bar 64 which does not in any way disturb the lateral placement of the claw, and an independent framing adjustment such as cam 70 which in no way disturbs either the amount of the throw or the lateral placement of the claw. Furthermore, the pull-down motion has been improved as stated above to provide a rapid action with accurate placement of the frame in the aperture with light gate tension and minimum wear on the film.

We claim as our invention:

1. An intermittent film advancing mechanism comprising a rotatable cam, an arm adapted to be pivoted at one end and oscillated at the other end in conformance with the configuration of said cam, and a pivot construction for said pivoted end of said arm, said construction including means for adjustably positioning the pivoted end of said arm perpendicularly of the plane of oscillation of said arm, and means for adjusting the pivot point along the pivot end of said arm in the plane of oscillation of said arm.

2. An intermittent film advancing mechanism in accordance with claim 1 in which said pivot construction includes means for adjusting the pivot point of said arm parallel to the direction of movement of the other end of said arm.

3. An intermittent film advancing mechanism in accordance with claim 1 in which a second rotatable cam is provided for moving said oscillating end of said arm at right angles to its direction of movement by said first mentioned cam.

4. An intermittent film advancing mechanism comprising an arm having one end pivoted and the other end movable in a predetermined path, a rotatable cam intermediate the ends of said arm and adapted to move the movable end of said arm in said predetermined path, and a pivot construction for said arm, said pivot construction including a mounting having a pair of elements connected to the pivot end of said arm, one of said elements having its axis substantially parallel with the axis of said arm and the other of said elements having its axis substantially perpendicular to the axis of said arm and adjustable along said arm with respect to said perpendicular position.

5. An intermittent film advancing mechanism in accordance with claim 4 in which said elements are substantially straight.

6. An intermittent film advancing mechanism comprising an arm having one end adapted to be pivoted and the other end adapted to be moved in a predetermined path, a rotatable cam positioned intermediate the ends of said arm and adapted to move the movable end of said arm in said predetermined path, a resilient element attached to the pivot end of said arm, a fixed horizontally positioning mount for the other end of said element, means positioned in contact with said element for determining the point about which said arm pivots, and means for adjusting the contact point of said last mentioned means along said element.

7. An intermittent film advancing mechanism in accordance with claim 6 in which said last mentioned adjustable means includes a projection making line contact with said element, resilient means being provided for bearing against said element on the opposite side thereof from said projection.

8. An intermittent film advancing mechanism comprising a constant speed rotatable cam, an arm adapted to bear on the surface of said cam at a point intermediate the ends of said arm, means for pivoting one end of said arm to determine the path in which the other end of said arm is movable, said last mentioned means including a horizontally adjustable mount connected to the pivot end of said arm for determining the position of the vertical plane in which said movable end is movable, a horizontal adjustable pivot point in contact with the pivot end of said arm for determining the distance between said pivot point and the point of contact of said arm with said cam for controlling the distance of movement of said movable end of said arm in a vertical direction, and means for vertically adjusting the pivot point of said arm for determining the position of the vertical path of the movable end of said arm in said vertical plane.

9. An intermittent film advancing mechanism in accordance with claim 8 in which said first mentioned horizontally adjustable mount comprises a bracket and a resilient element having an axis substantially parallel to the axis of said arm and interconnecting the pivot end of said arm and said bracket.

10. An intermittent film advancing mechanism in accordance with claim 8 in which said horizontally adjustable pivot point comprises a horizontally adjustable plate making line contact on said arm, said plate being adjustable both substantially parallel with the axis of said arm and perpendicularly to the axis of said arm, means being provided to maintain said arm against said pivot point and said arm in contact with said cam.

11. An intermittent film advancing mechanism comprising an arm, a film advancing claw on one end of said arm, a rotatable cam for oscillating said claw, means for fixedly determining the distance between the contact point of said arm with said cam and the pivot point of the other end of said arm, and means for varying said distance while maintaining a constant distance between said claw and said contact point.

12. A cam-operated pull-down mechanism, comprising a rotatable shaft, a cam on said shaft, an arm having a toothed claw at one end for advancing film, a cam follower on said arm adapted to contact said cam, means for maintaining contact between said cam follower during rotation of said cam by said shaft, and means for pivoting the other end of said arm, said pivot means being movable along said arm to maintain a constant distance between said claw and said cam, said cam having a configuration so that said claw has an initial slow motion through a sufficient distance to take up variations in tooth clearance, followed by a period of substantially constant positive acceleration of the film, followed immediately by a period of substantially constant and equal negative acceleration of the film, and ending in a movement of the order of one-half percent of the total movement, during which rates of retardation are relatively low.

13. A cam-operated pull-down mechanism in accordance with claim 12, and further characterized in that a small reversed movement takes place immediately after the claw is brought to rest, the magnitude of the initial reverse movement being sufficient to insure clearance of the film by the claw teeth during withdrawal of the teeth from the film, said withdrawal being timed to begin after said initial reverse movement has reached the magnitude necessary for said clearance.

14. A cam-operated pull-down mechanism for motion picture apparatus, comprising a toothed claw, a cam, a cam follower, means for communicating motion from said follower to said claw, said means including an arm having said claw at one end thereof, means for pivoting the other end of said claw, said pivot means being movable axially along said arm to vary the amount of said stroke of said claw while maintaining a constant distance between said claw and said cam, and means for advancing the teeth of said claw into film perforations and withdrawing them therefrom, said cam having a configuration to impart to said claw a forward stroke characterized by an initial slow motion through a sufficient distance to take up variations in tooth clearance followed by a period of substantially constant positive acceleration, followed quickly by a period of substantially constant and equal negative acceleration, and ending in a movement of the order of one-half percent of the total movement during which rates of retardation are relatively low, completion of the forward movement being followed by a small reverse movement prior to withdrawal of said teeth from said perforations.

EDWARD W. KELLOGG.
WARREN R. ISOM.

REFERENCES CITED

The following references are of record in the file of this patent:

UNITED STATES PATENTS

| Number | Name | Date |
|---|---|---|
| 1,227,887 | Connor et al. | May 29, 1917 |
| 2,168,771 | Howell | Aug. 8, 1939 |
| 2,281,726 | Stechbart | May 5, 1942 |